(No Model.)
W. A. PITT.
FILTER.
No. 256,853. Patented Apr. 25, 1882.
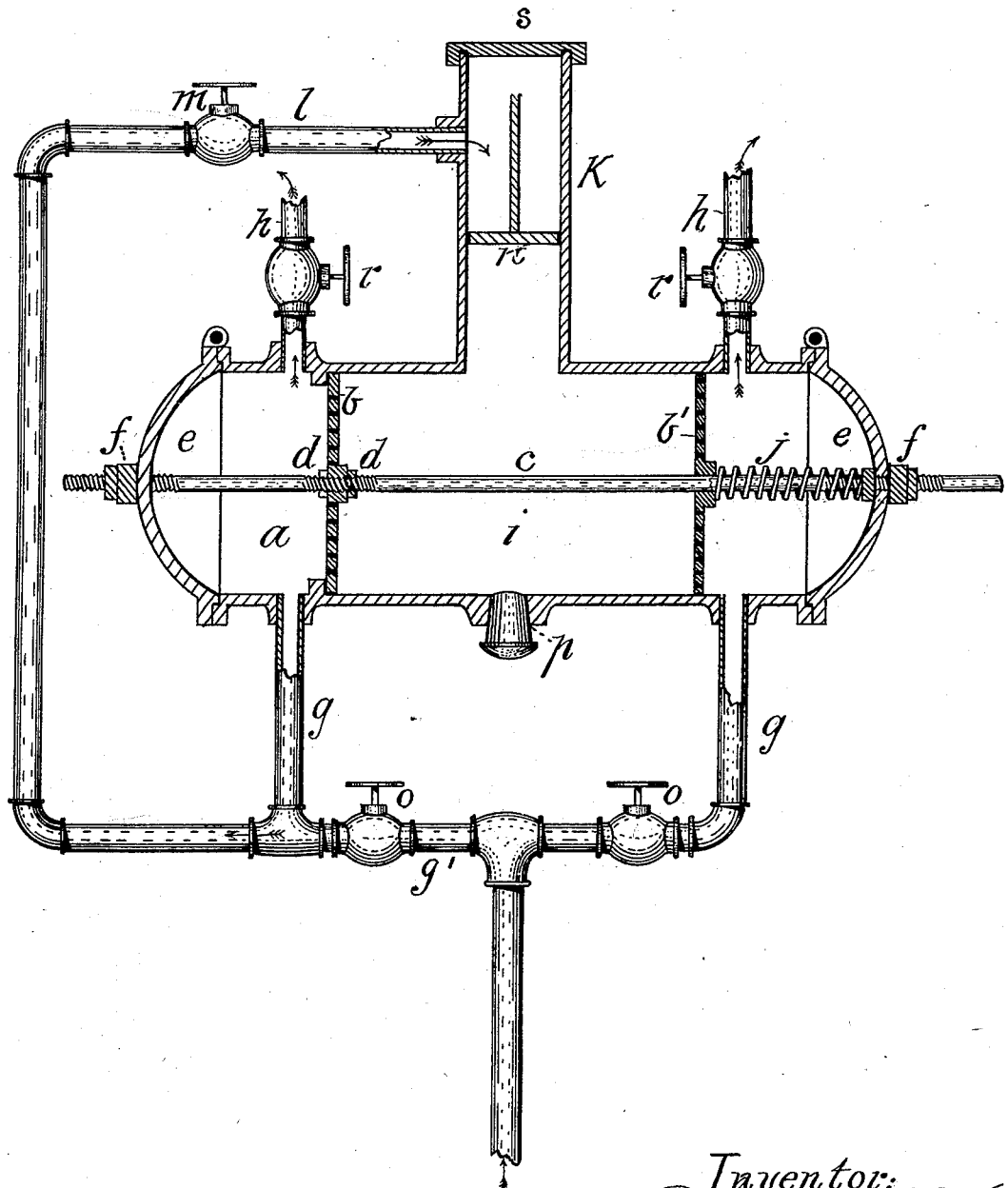
Witnesses.
William Scott
C. F. Post
Inventor:
William A. Pitt

UNITED STATES PATENT OFFICE.

WILLIAM A. PITT, OF NEW YORK, N. Y.

FILTER.

SPECIFICATION forming part of Letters Patent No. 256,853, dated April 25, 1882.

Application filed July 16, 1881. (No model.)

*To all whom it may concern:*

Be it known that I, WILLIAM A. PITT, a citizen of the United States, residing at the city of New York, in the county and State of New York, have invented certain new and useful Improvements in Filters, of which the following is a full, clear, and exact description, reference being had to the accompanying drawing.

The objects of my improvements are, first, to afford facilities for keeping the filtering material contained in the tank continuously compressed; and, second, to so arrange the connecting-pipes that the covers may be removed without disturbing such connections. I attain these objects by the mechanism shown in the accompanying drawing, which represents my improved filter in horizontal section.

*a* is the body of the filter, and *b b'* perforated diaphragms which form the compartment for containing the filtering material, the former being secured upon the rod *c*, which passes through it, by means of nuts *d d*, the rod being provided with a suitable screw-thread for that purpose.

*e e* are hinged covers, secured in position by nuts *f f*, which work on screw-threaded ends formed on the rod *c*.

The water-supply pipes are arranged in the side of the cylinder, as seen at *g g*, near the head thereof, but so as to be entirely out of the way when it becomes necessary to remove the cover for any purpose. The discharge-pipes *h h* are similarly arranged in the side opposite the supply-pipes. By making all the connections in the side or body of the tank they are not obliged to be removed or disturbed when it is found necessary to remove the covers, as is the case where the pipes are connected directly with the covers, as is shown in my patent dated March 23, 1880.

The filtering-chamber *i* may be filled with charcoal or any other material commonly used for filtration, and the pressure exerted upon it is accomplished by a pressure-plate and pressure-plunger acting respectively in a lateral and vertical direction, as will now be described. The perforated diaphragm *b'* serves as the pressure-plate by working loosely on the rod *c*, and its adjustment is controlled by a spring, *j*, on the rod *c*. When the chamber *i* is filled with its filtering medium the plate *b'* is forced into position and held by the pressure of the spring against the material, the spring yielding and the plate receding as the material wears away. The stand-pipe *k* opens into the filtering-chamber, and is designed to be packed to about one-third of its height with filtering material. With this pipe is connected a supply-pipe, *l*, which in turn is connected with the main supply-pipe. A cock or valve, *m*, in pipe *l* regulates the flow of water into the pipe *k*. A loose plunger, *n*, is arranged to work up and down in the stand-pipe *k*. When pressure is required at this point on the filtering material the valves *o* and *m* in main supply-pipe *g'* and connecting-pipe *l* are opened, when the pressure of the water upon the loose plunger *n* will force it down and cause it to compress the material in the chamber to the necessary degree. It will thus be seen that as the material within the chamber is worn away by use the automatic working of the plate *b'* and plunger *n* enables a uniform pressure to be exerted on the top and side of the remaining material, thus rendering the filter always serviceable without frequent attention.

By the use of my self-adjusting compressing-plates I am enabled to save a great amount of labor hitherto necessary when regulating such adjustments by hand, and also am able to secure a more perfectly working and reliable operating mechanism.

I provide the stand-pipe *k* with a hand-hole, *s*, in the top, through which access may be had to its interior.

The filtering-chamber is charged with material through opening *p*, arranged in the side. Valves *o o* and *r r* regulate the flow through pipes *g g* and *h h* into the filter.

The operation of my improved filter is as follows: Valve *o* in the left-hand supply-pipe *g* and valve *r* in the right-hand discharge-pipe *h* being both closed, and valve *o* in the right-hand supply-pipe being opened, water will flow through this pipe into the cylinder, and thence by a diagonal course through the filtering-chamber *i* and be discharged through pipe *h* on the opposite side of the filter, the flow therefrom being regulated by valve *r*. When it becomes necessary to cleanse the interior of the filter a reverse current is produced by permitting the water to enter at the left-hand supply-pipe *g*, thence through the filtering-chamber in a diagonal course, and be discharged from the right-hand pipe $h$ on the opposite side of the filter.

The filtering operation can be effected in a diagonal course from either end of the filter, as desired, the reverse operation of course being the cleansing process.

Both of the supply-pipes $g\ g$ are arranged on one side of the filter, but at opposite ends, and both discharge-pipes $h\ h$ are similarly located on the other side, and all these pipe-connections are made in the body of the vessel between the diaphragms and covers $e\ e$. This prevents the necessity of removing the pipe-connections before the covers can be thrown back in order to get access to the interior of the vessel, which must always be done where the pipe-connections are made in the head or cover of the vessel. During the filtering operation the automatic working of the pressure-plate $b'$, whereby a continuous pressure is maintained upon the side of the filtering medium, and the automatic working of the plunger $n$, whereby a top pressure is exerted, causes the material to be kept tightly packed or compressed and of proper density as it gradually wears away.

I claim—

1. The combination, with a filtering-vessel, of automatically-operating devices for compressing the filtering material laterally and vertically, substantially in the manner and for the purpose set forth.

2. The combination, with the filtering-chamber of a filter, of a pipe connected with such chamber and a loose plunger arranged therein and operated by means of a head of water, substantially as and for the purpose specified.

3. The combination of the filter $a$, stand-pipe $k$, provided with the hand-hole $s$, plunger $n$, pipe $l$, and valve $m$, all arranged and operating in the manner and for the purpose set forth.

4. The combination of the vessel $a$, rod $c$, adjustable diaphragm $b'$, and spring $j$, arranged on said rod, and operating in the manner set forth.

5. The combination, with the vessel $a$, provided with covers $e\ e$, rod $c$, and diaphragms $b\ b'$, of the supply-pipes $g\ g$ and discharge-pipes $h\ h$, arranged in the side of the vessel and between the said diaphragms and covers, substantially as and for the purpose set forth.

6. The combination, with a filter, of an automatic-working pressure-plate and plunger, whereby both a lateral and vertical compression of the filtering material is effected, substantially as set forth.

WILLIAM A. PITT.

Witnesses:
K. NEWELL,
WILLIAM SCOTT.